Figures 1, 2:
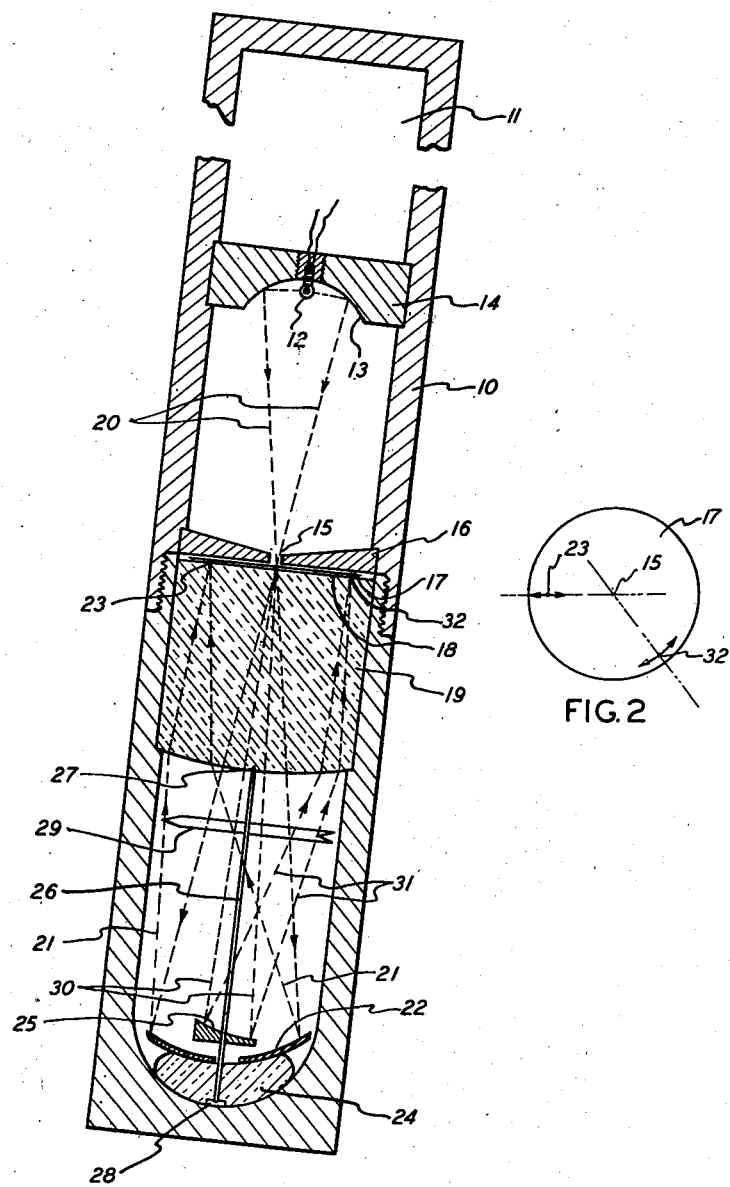

Sept. 29, 1942.  P. JONES  2,296,996
DIRECTIONAL DRIFT RECORDER
Filed Aug. 3, 1940

PHILIP JONES
INVENTOR

Paul W. Pritzman
ATTORNEY

Patented Sept. 29, 1942

2,296,996

UNITED STATES PATENT OFFICE 2,296,996

DIRECTIONAL DRIFT RECORDER

Philip Jones, Los Angeles, Calif.

Application August 3, 1940, Serial No. 351,069

10 Claims. (Cl. 33—205.5)

The object of the invention is to provide an instrument for recording the inclination of a bored hole or well together with an indication on the record of the compass bearing of the direction of inclination.

In my copending application entitled "Drift recorder," filed March 18, 1939 under Serial No. 262,666, is described a device for the measurement of the angle of inclination of bored wells in which light is projected through a perforated record disk onto a mirror of which the position, relatively to the axis of the device, varies with the inclination of the instrument, the said light being reflected by the mirror onto the sensitized surface of the disk to produce a record spot.

In the device there described, no indication of the direction of inclination is made. The present invention, which is an extension of and improvement over that of the copending application, has for its purpose the indication, preferably on the same record as that of the inclination, the azimuth thereof.

This is accomplished by the provision of a supplementary mirror arrangement whereby a second record spot is produced upon the sensitized surface at positions thereon which are determined by the rotational position of the mirror, rather than by the inclination of its axis to the axis of the device.

The invention may best be explained with reference to the attached drawing, in which Fig. 1 illustrates in a highly simplified vertical section the essential elements of the device and Fig. 2 illustrates a typical record produced thereby.

Referring to the drawing, and particularly to Fig. 1, 10 is a case provided at its upper end with a chamber 11 to receive batteries not shown. A lamp 12 is fixed in the center of a suitably curved reflecting surface 13 formed on the lower side of a partition member 14. This surface is so formed as to concentrate the light rays emitted by the lamp onto an opening 15 centrally located in an opaque shield member 16.

The record disk 17, preferably of a slow or "printing-out" paper, is perforated centrally as at 15 in Fig. 2 and is retained by the shield in contact with the plano upper surface 18 of a plano-convex lens 19, the sensitized surface of the disk being downwardly directed.

The light rays suggested at 20 pass through the opening 15 and lens 19 and are reflected as at 21 by a mirror 22 to the convex surface of the lens and through it to a point 23 on the sensitized record surface. The light thus concentrated at a minute point is of sufficient intensity to produce a black spot on the record surface with considerable rapidity. The mirror 22 is so supported as to maintain constantly a horizontal (i. e., axially vertical) position, in consequence of which the position of spot 23 as regards the center of opening 15 in the record disk is a function of the momentary inclination of the instrument but is indifferent to its rotational position. In the drawing, mirror 22 is shown as being supported by a globule of mercury 24, but it may be otherwise supported if preferred, as for example on gimbals.

To this point the description is an abbreviated repetition of the disclosure of the copending application on which the improvement is based. The improvements are as follows:

A secondary mirror 25 is mounted in a fixed angular inclination to the axis of the instrument. This mirror may be mounted on a shaft 26 axially supported by frictionless bearings in the lower end of the lens as at 27 and in the lower end of the case as at 28. To this shaft, or to the mirror as may be preferred, is affixed a suitable means for orientation of the mirror by terrestrial magnetism. This means may consist of a magnet attached to the mirror or to the shaft, or the mirror may be formed on the surface of magnetized ferrous material. This means, in broad terms, is indicated in the drawing by the symbol of a compass needle 29.

The secondary mirror is so inclined to the axis of the instrument that the light rays 30 are reflected as at 31 to and through the lens to a point 32 located near the edge of the record disk, at which point they produce a second spot as above described. As the mirror is stationary on the shaft, the distance from point 32 to the center of the record is constant, and as it is fixed by terrestrial magnetism in its relation to magnetic north, its rotational position on the record is a function of the rotational position of the instrument and is indifferent to its inclination.

The azimuth of the record is therefore determinable by measuring the angular relation between radii intersecting the two record spots 23 and 32 and referring the latter to its predetermined angular relation to the magnetic north pole.

I claim as my invention:

1. In a well surveying device: a tubular housing; a perforated, light-sensitive record disk transversely disposed in said housing; means for projecting light rays through the perforation in said disk, and direction-responsive means including a concave mirror for projecting the rays so projected upon said record disk so as to produce a record of the orientation of said disk.

2. In a well surveying device: a perforated, light-sensitive record disk; a mirror adapted to assume a constant position in azimuth; means for projecting light rays through the perforation in said disk; means including said mirror whereby an image of the perforation in said disk is projected upon said disk at a position thereon in the meridian plane through the center of said disk.

3. In a well surveying device: a tubular housing; a perforated, light-sensitive record disk transversely disposed in said housing; means for projecting light rays through the perforation in said disk; an inclination-responsive mirror for projecting some of the rays so projected upon said record disk in the plane of inclination of said housing; a direction-responsive mirror for projecting other of said rays upon said disk in the meridian plane therethrough, whereby the angle between said planes may be determined.

4. In a well surveying device: a perforated, light-sensitive record disk; means for illuminating the perforation in said disk; a mirror adapted to assume a constant position in azimuth and to form an image of said perforation in known azimuth; a lens adapted to form an image of said image on said record disk at a position thereon in known azimuth.

5. In a well surveying device: a tubular housing; an optical train consisting of a perforated record disk, a lens, a reflecting surface asymmetrically disposed with respect to the axis of said housing, the said lens and the said record disk, in the order recited; said lens and said reflecting surface being so related that an image of the perforation in said record disk is projected upon the surface thereof; means associated with said reflecting surface whereby the position of said image on said disk is determined by the orientation of said reflecting surface; photographic means whereby the position of said image on said disk is recorded.

6. In a well surveying device: a tubular housing; a perforated, light-sensitive record disk transversely disposed in said housing; means for projecting light rays through the perforation in said disk; a mirror asymmetrically arranged with respect to the axis of said housing, said mirror being arranged to be rotatable about said axis, to assume a constant position in azimuth and to project the rays so projected upon said record disk at a position thereon determined by the rotational position of said mirror.

7. In a well surveying device: a tubular housing; a perforated, light-sensitive record disk transversely disposed in said housing; means for projecting light rays through the perforation in said disk; a mirror arranged to maintain its reflecting surface in constant angular relation to the axis of said housing and to form an image of the perforation in said disk at a constant position in azimuth; photographic means whereby the position of said image is recorded on said disk.

8. In a well surveying device: a perforated, light sensitive record disk; a spherically arcuate mirror arranged to assume a constant position in azimuth; means for projecting light rays through the perforation in said disk; means including said mirror whereby an image of the perforation in said disk is projected upon said disk at a position thereon in the meridian plane through the center of said disk.

9. In a well surveying device: a tubular housing; a perforated, light sensitive record disk transversely disposed in said housing; means for projecting light rays through the perforation in said disk; inclination-responsive means for projecting some of the rays so projected upon said record disk in the plane of inclination of said housing; direction-responsive means for projecting other of said rays upon said disk in the meridian plane therethrough, whereby the angle between said planes may be determined, each of said responsive means including a spherically arcuate mirror.

10. A method of determining the amount and direction of inclination of a surveying device including a light-sensitive record disk, comprising the projection of a pencil of light rays coaxially with said device upon reflecting surfaces; projecting a converging pencil of said rays to a position on the record disk in the vertical plane through the axis of said device, and projecting another converging pencil of said rays to a position on the record disk in the meridian plane through the center of said disk.

PHILIP JONES.